No. 734,596. PATENTED JULY 28, 1903.
R. W. PAIN.
MUSIC ROLL.
APPLICATION FILED MAY 29, 1903.
NO MODEL.
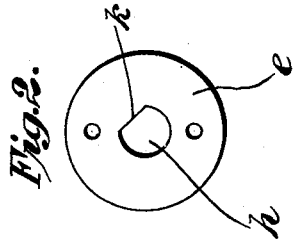
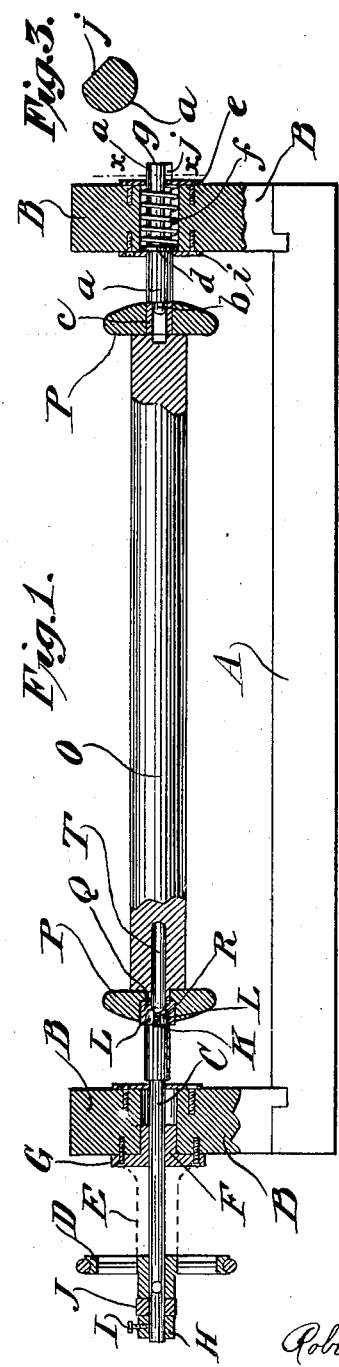
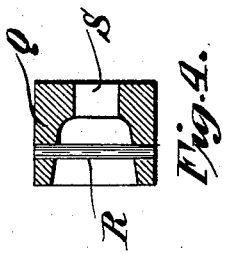
Robert Williard Pain
Inventor
By Dickerson Brown
Raegener & Kenney
Attys
Witnesses
E. Mitchell
A. L. O'Brien No. 734,596. Patented July 28, 1903.

UNITED STATES PATENT OFFICE.

ROBERT WILLIARD PAIN, OF NEW YORK, N. Y.

MUSIC-ROLL.

SPECIFICATION forming part of Letters Patent No. 734,596, dated July 28, 1903.

Application filed May 29, 1903. Serial No. 159,253. (No model.)

*To all whom it may concern:*

Be it known that I, ROBERT WILLIARD PAIN, a citizen of the United States, and a resident of the borough of Manhattan, city, county, and State of New York, have invented certain new and useful Improvements in Music-Rolls, of which the following is a specification, accompanied by drawings.

This invention relates to music-rolls; and its object is to improve upon the means heretofore devised for locking the music-roll to the rotating parts in a mechanical musical instrument.

To this end the invention consists of a music-roll for carrying out the above object and embodying the features of construction, combinations of elements, and arrangement of parts having the general mode of operation substantially as hereinafter fully described and claimed in this specification and shown in the accompanying drawings, in which—

Figure 1 is a side elevation, in longitudinal section, of a music-roll and the attachments therefor embodying this invention. Fig. 2 is a detail face view of one of the end washers for the apparatus. Fig. 3 is a transverse sectional view on the line $x\ x$ of the spring-plug shown in Fig. 1 to illustrate the shape of said plug. Fig. 4 is a longitudinal sectional view of the socket at one end of the music-roll, the section through which Fig. 4 is taken being at right angles to the plane upon which the section of the plug as shown in Fig. 1 is taken.

Referring to the drawings, A represents a portion of the frame of a musical instrument, in this instance uprights B being secured upon the portion of the frame A shown. The shaft C is suitably supported in one of the uprights B, and any suitable means may be provided for rotating said shaft, as shown the shaft being provided with a wheel or pulley D, and the music-roll is adapted to be locked to the shaft and centered thereon in order that it may rotate with the shaft. At the other side of the frame suitable means are provided for revolubly supporting the other end of the roll.

According to this invention novel means are provided for locking the roll to the shaft C, one of these parts being provided with a slotted portion and the other with a pin adapted to said slotted portion, whereby the shaft and the roll may rotate together. The shaft C is supported in a suitable bracket E, having the apertured plug F, affording a bearing for the shaft, and the flange G, affording means for securing the plug within the recessed portion of the upright B. The shaft C is suitably prevented from longitudinal movement, as by means of the collar H and set-screw I, adapted to be secured upon the end of the shaft outside of the bent portion J of the bracket E. As shown in this instance, the end of the shaft C is slotted, as at K, and the tongues L, formed by the slot, are tapered to substantially a point, as shown. The roll comprises the body portion O and the flanges P. Inside one flange is arranged a metallic socket Q, tapered inwardly to fit the taper of the tongues L on the shaft C, and extending across the mouth of the socket is shown a pin R, adapted to enter the slot K in the end of the shaft C when the roll is placed in position upon said shaft. The socket Q may be suitably secured to the roll, as shown the neck of the socket being hollow, as at S, within which a suitable pin T may be fitted, which pin is embedded in the body portion of the roll. The construction shown affords provision for attachment of the flange P directly over the socket Q. When the socket Q is slipped over the tapering and slotted end of the shaft C, it will be seen that the roll is locked to the shaft and the parts are easy of manipulation, because the tapering end of the shaft readily slips into the socket Q and is centered therein as it enters. The pin R readily slips into the slot K of the shaft without adjustment of the parts.

Suitable means, as stated, are provided for supporting the other end of the roll, as shown in this instance the upright B being provided with an aperture within which the spring-pin $a$ operates. This pin is provided with a rounded knob $b$ at its end, which is adapted to enter the hollowed end of the plug $c$, shown embedded in the body portion O of the roll. The flange P of the roll may be suitably secured about the plug $c$. The spring-pin $a$ is provided with a collar $d$, between which and the outer washer $e$ the coiled spring $f$ is compressed. The outer end $g$ of the pin projects through the aperture $h$ in the washer $e$, while the other end of the pin projects through an aperture in the washer $i$, so that the pin may be moved longitudinally against the tension of the spring to permit the insertion of the roll between the pin $a$ and the shaft C. In order to prevent rotation of the pin $a$, one side of the same is flattened, as at $j$, and the aperture $h$ in the washer $e$ is provided with a flat side $k$, so that the pin $a$ will not rotate, although the roll will rotate upon the same.

According to this invention the roll may be readily slipped into place and as readily removed therefrom. The parts are simple and cheap in construction and are not liable to get out of order, nor may they be easily broken. The roll is perfectly centered and may be rotated at a high speed without disarrangement of the parts.

This invention is not to be understood as being limited to a socket having a cross-pin therein, for any other locking means may be provided in the socket adapted to coöperate with the slotted portion of the shaft and lock the roll and shaft together, and while I have shown the slotted portion of the shaft as tapering the invention is not to be understood as being limited to a tapering slotted portion.

Obviously some features of this invention may be used without others, and the invention may be embodied in widely-varying forms.

Therefore without limiting the invention to the construction shown and described nor enumerating equivalents, I claim, and desire to secure by Letters Patent, the following:

1. The combination of a music-roll and a shaft, one being provided with a socket and the other with a slotted portion adapted to said socket, and the socket having locking means adapted to coöperate with the said slotted portion and lock the parts together, for substantially the purposes set forth.

2. The combination of a music-roll provided with a socket and a shaft having a slotted end adapted to the socket on the roll, and means provided in connection with said socket and adapted to coöperate with the slot in the end of the shaft for locking the shaft and roll together, for substantially the purposes set forth.

3. The combination of a music-roll and a shaft, one being provided with a tapering socket and the other with a tapering and slotted portion adapted to said socket, the socket also having a cross-pin adapted to coöperate with the said slotted portion and lock the roll and shaft together, for substantially the purposes set forth.

4. The combination of a music-roll provided with an inwardly-tapering socket and a shaft having an outwardly-tapering and slotted end adapted to said socket, the socket also having a cross-pin adapted to enter said slot in the end of the shaft and lock the shaft and roll together, for substantially the purposes set forth.

In testimony whereof I have signed this specification in the presence of two subscribing witnesses.

ROBERT WILLIARD PAIN.

Witnesses:
W. C. MANSFIELD,
G. E. BROWN.